H. W. MUNGER.
EXPANSION BOLT.
APPLICATION FILED APR. 12, 1911.
1,024,949.
Patented Apr. 30, 1912.
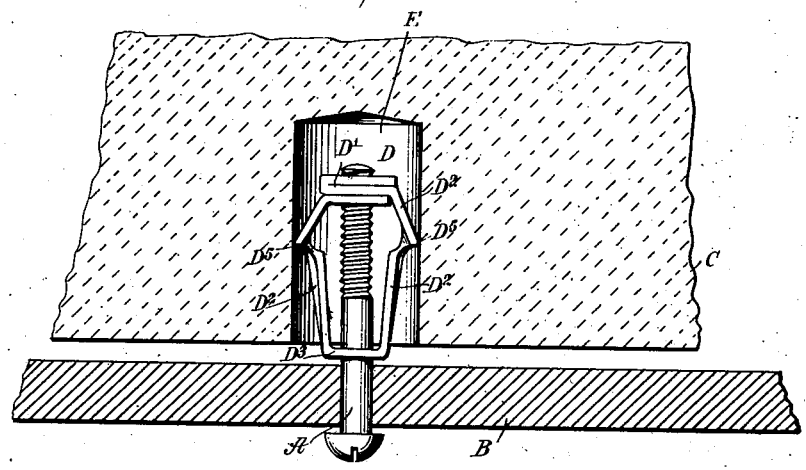
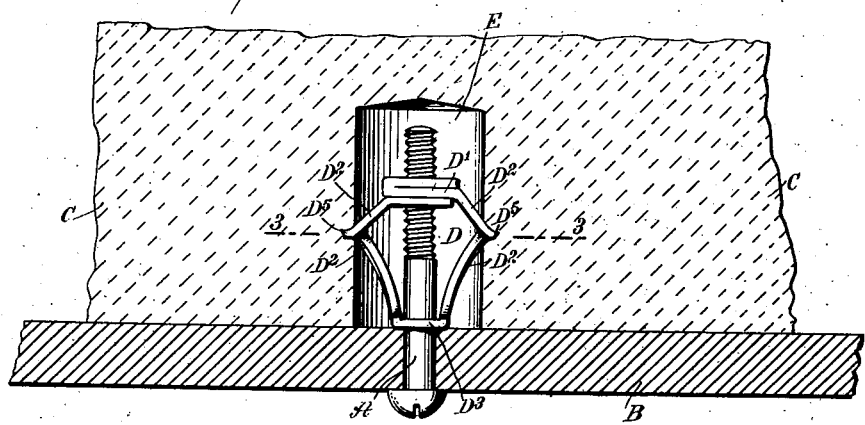
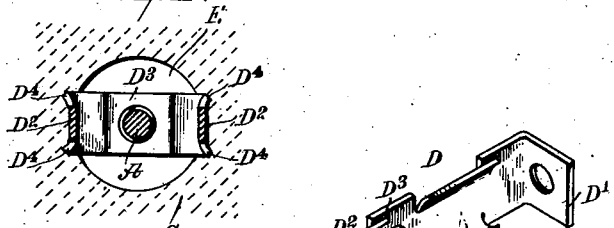
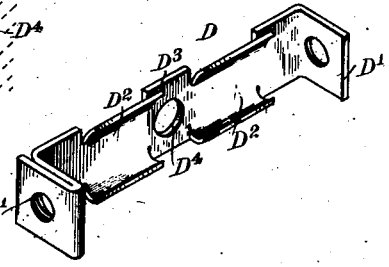
WITNESSES:
H. I. Walker
INVENTOR
Herbert W. Munger
BY
ATTORNEYS

UNITED STATES PATENT OFFICE.

HERBERT W. MUNGER, OF NEW YORK, N. Y.

EXPANSION-BOLT.

1,024,949.    Specification of Letters Patent.   Patented Apr. 30, 1912.

Application filed April 12, 1911. Serial No. 620,599.

*To all whom it may concern:*

Be it known that I, HERBERT W. MUNGER, a citizen of the United States, and a resident of the city of New York, borough of Manhattan, in the county and State of New York, have invented a new and Improved Expansion-Bolt, of which the following is a full, clear, and exact description.

The object of the invention is to provide a new and improved expansion bolt, more especially designed for use in concrete and similar plastic material constructions, and arranged to permit of securely fastening other parts to the concrete construction.
For the purpose mentioned, use is made of an expansion device, formed from a single piece of metal, and having a nut, angular side arms and a head, through which extends the bolt and screws into the nut.
A practical embodiment of the invention is represented in the accompanying drawings forming a part of this specification, in which similar characters of reference indicate corresponding parts in all the views.
Figure 1 is a plan view of the expansion bolt as applied, the concrete construction and the part to be secured thereto being shown in section; Fig. 2 is a similar view of the same and showing the bolt screwed up to fasten the part in position on the concrete construction; Fig. 3 is a sectional side elevation of the same on the line 3—3 of Fig. 2; and Fig. 4 is a perspective view of the piece of metal partly formed into the expansion device.

The bolt A for fastening a part B to a concrete construction C, or a similar support, engages an expansion device D held in a hole E formed in the concrete construction or support C. The expansion device D is made from a single piece of metal, having its ends overlapping, and one of the ends doubled up to form a nut D', connected by side arms D² with a head D³, having an aperture D⁴ for the passage of the bolt A, the side arms D² being bent into angular shape and provided with outwardly struck-up points D⁵ adapted to embed themselves in the wall of the hole E containing the expansion device D. The ends of metal, for forming the nut D', are soldered or otherwise fastened together, the overlapping thicknesses of metal forming a nut of a desired thickness for engagement by the threaded end of the bolt A, as will be readily understood by reference to Figs. 1 and 2.

In using the expansion bolt, the expansion device D is placed into the hole E and the bolt A is passed through the part B, to be fastened to the concrete construction C, and then screwed into the nut D' with the head D³ finally abutting against the inner face of the part B. Now on screwing up the bolt A, the nut D' is drawn outward toward the head D³, but as the latter is held against the inner face of the part B it is evident that the side arms D², which are held angularly bent, are bent still farther in an outward direction, so that the points D⁵ embed themselves in the concrete material, and consequently the expansion device D is firmly held in place on the wall of the hole E, and the part D is securely bolted to the concrete construction C, as will be readily understood by reference to Fig. 2. The side arms D² at the portions between the head D³ and the points D⁵ are curved inwardly from opposite sides, so as to render the outer portions of the side arms exceedingly strong to resist crushing strains and to allow the said portions to move outward, so that the points D⁵ embed themselves in the concrete construction C. By making the nut, angular side arms and the head from one single piece, the expansion device can be cheaply manufactured, and the expansion bolt is practically formed of only two pieces, that is, the bolt A and the expansion device D.

Having thus described my invention, I claim as new and desire to secure by Letters Patent:

1. An expansion bolt comprising an expansion member formed of a strip of metal having a central opening and side portions provided with angular ends secured in overlapping relation between the side portions, each of said side portions comprising two obtusely angular sections, one of which has engaging spurs bent outwardly at the point of connection of the sections, said overlapping ends being provided with a threaded aperture in line with said central opening, and a bolt extending through said central opening and said aperture and engaging the threads of the latter.

2. An expansion bolt comprising an expansion member formed of a strip of metal having a central opening and side portions provided with angular ends secured in overlapping relation, each of said side portions comprising two obtusely angular sections transversely slitted, one of said sections having its material bent outwardly at the sides of certain of the slits to form engaging spurs, and the other of said sections having its material curved transversely, said overlapping ends being provided with a threaded aperture in line with said central opening, and a bolt extending through said central opening and said aperture and engaging the threads of the latter.

In testimony whereof I have signed my name to this specification in the presence of two subscribing witnesses.

HERBERT W. MUNGER.

Witnesses:
 THEO. G. HOSTER,
 PHILIP D. ROLLHAUS.